(12) United States Patent
Nagar et al.

(10) Patent No.: US 9,284,884 B2
(45) Date of Patent: *Mar. 15, 2016

(54) TRAPPED BURNED GAS FRACTION CONTROL FOR OPPOSED-PISTON ENGINES WITH UNIFLOW SCAVENGING

(71) Applicant: Achates Power, Inc., San Diego, CA (US)

(72) Inventors: Nishit Nagar, San Diego, CA (US); Donovan M. Quimby, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/974,883

(22) Filed: Aug. 23, 2013

(65) Prior Publication Data

US 2014/0373815 A1 Dec. 25, 2014

Related U.S. Application Data

(60) Provisional application No. 13/926,360, filed on Jun. 25, 2013.

(51) Int. Cl.
*F02B 47/08* (2006.01)
*F02B 75/24* (2006.01)
(Continued)

(52) U.S. Cl.
CPC . *F02B 75/28* (2013.01); *F01B 7/14* (2013.01); *F01B 17/02* (2013.01); *F02B 45/08* (2013.01); *F02D 21/08* (2013.01);
(Continued)

(58) Field of Classification Search
CPC .......... F02M 25/0752; F02M 25/0707; F02M 25/0737; F02M 25/0731; F02D 41/006; F02D 2041/001; F02D 13/0269; F02B 1/04; F02B 2075/027; F02B 17/00; F02B 71/04; F02B 2075/025; F02B 75/28; F02B 25/00; F02B 25/12
USPC ............ 123/568.14, 568.12, 316, 46 R, 51 B, 123/52.2
See application file for complete search history.

(56) References Cited

U.S. PATENT DOCUMENTS

| 5,323,748 A * | 6/1994 | Foster .................. F02D 35/023 123/435 |
| 5,509,394 A | 4/1996 | Hitomi et al. .............. 123/559.1 |

(Continued)

FOREIGN PATENT DOCUMENTS

| EP | 1528241 A2 | 5/2005 |
| FR | 2868127 A1 | 9/2005 |

(Continued)

OTHER PUBLICATIONS

International Search Report and Written Opinion for PCT application PCT/US2011/000864, mailed Aug. 1, 2011.

(Continued)

*Primary Examiner* — Stephen K Cronin
*Assistant Examiner* — Syed O Hasan
(74) *Attorney, Agent, or Firm* — Terrance A. Meador

(57) ABSTRACT

A trapped burned gas fraction is controlled in a two-stroke cycle opposed-piston engine with uniflow scavenging by adjusting an external EGR setpoint in real time. The adjusted setpoint is used to control EGR flow in the engine's air handling system.

15 Claims, 4 Drawing Sheets

(51) Int. Cl.

| | | |
|---|---|---|
| *F02B 71/00* | (2006.01) | |
| *F02B 75/28* | (2006.01) | |
| *F02D 43/00* | (2006.01) | |
| *F02D 41/00* | (2006.01) | |
| *F02D 41/14* | (2006.01) | |
| *F02B 45/08* | (2006.01) | |
| *F01B 7/14* | (2006.01) | |
| *F02D 21/08* | (2006.01) | |
| *F01B 17/02* | (2006.01) | |
| *F02M 35/10* | (2006.01) | |
| *F02B 29/04* | (2006.01) | |
| *F02B 33/00* | (2006.01) | |
| *F02B 37/24* | (2006.01) | |
| *F02B 39/04* | (2006.01) | |
| *F02M 25/07* | (2006.01) | |

(52) U.S. Cl.
CPC ....... *F02D 41/0007* (2013.01); *F02D 41/0062* (2013.01); *F02D 41/0072* (2013.01); *F02D 41/1458* (2013.01); *F02D 43/00* (2013.01); *F02B 29/0412* (2013.01); *F02B 29/0418* (2013.01); *F02B 33/00* (2013.01); *F02B 37/24* (2013.01); *F02B 39/04* (2013.01); *F02B 75/282* (2013.01); *F02D 2041/141* (2013.01); *F02D 2200/0402* (2013.01); *F02D 2200/0411* (2013.01); *F02M 25/0707* (2013.01); *F02M 25/0727* (2013.01); *F02M 35/1038* (2013.01); *F02M 35/10386* (2013.01); *Y02T 10/144* (2013.01); *Y02T 10/47* (2013.01)

(56) References Cited

U.S. PATENT DOCUMENTS

| | | | |
|---|---|---|---|
| 6,742,335 B2 | 6/2004 | Beck et al. | 60/605.2 |
| 6,925,971 B1 | 8/2005 | Peng et al. | 123/46 R |
| 6,948,475 B1 | 9/2005 | Wong et al. | 123/299 |
| 7,281,531 B1 | 10/2007 | Fulton et al. | 123/568.17 |
| 7,565,892 B1 | 7/2009 | Cleary et al. | |
| 8,109,258 B2 | 2/2012 | Allain et al. | 123/568.16 |
| 8,549,854 B2 | 10/2013 | Dion et al. | |
| 2002/0195086 A1* | 12/2002 | Beck | B24B 3/003 |
| | | | 123/435 |
| 2003/0230276 A1 | 12/2003 | Kataoka et al. | |
| 2005/0096833 A1 | 5/2005 | Nakazawa | |
| 2006/0016438 A1 | 1/2006 | Kang | |
| 2008/0202469 A1* | 8/2008 | Kang | F02D 35/023 |
| | | | 123/435 |
| 2009/0159022 A1 | 6/2009 | Chu | 123/52.2 |
| 2009/0249783 A1 | 10/2009 | Gokhale et al. | 60/602 |
| 2010/0293943 A1 | 11/2010 | Teng et al. | 60/602 |
| 2010/0293944 A1 | 11/2010 | Hunter | 60/605.2 |
| 2011/0022289 A1 | 1/2011 | Hofbauer | 701/103 |
| 2011/0289916 A1 | 12/2011 | Dion et al. | 60/605.2 |
| 2012/0125298 A1* | 5/2012 | Lemke | F01B 7/14 |
| | | | 123/51 B |
| 2012/0210985 A1* | 8/2012 | Fuqua | F01L 1/38 |
| | | | 123/51 B |
| 2013/0125544 A1 | 5/2013 | Mond et al. | |
| 2013/0174545 A1 | 7/2013 | Andrasko et al. | |
| 2013/0174548 A1 | 7/2013 | Dion | 60/605.2 |
| 2013/0333665 A1 | 12/2013 | Pursifull | |
| 2014/0299104 A1 | 10/2014 | Quechon et al. | |
| 2014/0373814 A1 | 12/2014 | Herold et al. | |

FOREIGN PATENT DOCUMENTS

| | | | |
|---|---|---|---|
| FR | 2982641 A1 | 5/2013 | |
| WO | 2011/146111 A1 | 11/2011 | F02B 25/08 |
| WO | 2012/067643 A1 | 5/2012 | F01B 7/14 |
| WO | 2013/126347 A1 | 8/2013 | |
| WO | WO 2014/146111 A1 | 12/2014 | |

OTHER PUBLICATIONS

International Search Report and Written Opinion for PCT application PCT/US2013/026737, mailed Jun. 26, 2013.
International Search Report and Written Opinion for PCT application No. PCT/US2014/042394, mailed Oct. 17, 2014.
International Search Report and Written Opinion for PCT application No. PCT/US2014/051102, mailed Dec. 15, 2014.
International Search Report and Written Opinion for PCT application No. PCT/US2014/051108, mailed Nov. 24, 2014.
Non-Final Office Action mailed Jan. 2, 2015 in U.S. Appl. No. 13/926,360.
Amendment and Request for Reconsideration submitted by EFS on Apr. 2, 2015 in U.S. Appl. No. 13/926,360.
Final Action mailed May 1, 2015 in U.S. Appl. No. 13/926,360.
Blair, G. P., Chapter 1: "Introduction to the Two-Stroke Engine"; *Design and Simulation of Two-Stroke Engines*; 1996; pp. 1-34.

\* cited by examiner

TRAPPED BURNED GAS FRACTION CONTROL FOR OPPOSED-PISTON ENGINES WITH UNIFLOW SCAVENGING

PRIORITY

This application is a continuation-in-part of U.S. application Ser. No. 13/926,360, filed Jun. 25, 2013, which is incorporated herein by reference.

RELATED APPLICATIONS

This application contains subject matter related to that of the following commonly-assigned applications: U.S. application Ser. No. 13/068,679, filed May 16, 2011, published as US 2011/0289916 on Dec. 1, 2011; PCT application US2013/026737, filed Feb. 19, 2013, published as WO 2013/126347; U.S. application Ser. No. 13/782,802, filed Mar. 1, 2013, published as US 2013-0174548 on Jul. 11, 2013; and U.S. application Ser. No. 13/891,622, filed May 10, 2013, published as US 2014-0331656 on Nov. 13, 2014.

BACKGROUND

The field is two-stroke cycle internal combustion engines. Particularly, the field relates to uniflow-scavenged, opposed-piston engines with air handling systems that provide pressurized charge air for combustion, and that process the products of combustion. In some aspects, such air handling systems recirculate and mix exhaust gas with the pressurized charge air in order to lower combustion temperatures.

A two-stroke cycle engine is an internal combustion engine that completes a power cycle with a single complete rotation of a crankshaft and two strokes of a piston connected to the crankshaft. One example of a two-stroke cycle engine is an opposed-piston engine with one or more cylinders, in which two pistons are disposed in opposition in the bore of each cylinder for reciprocating movement in opposing directions. Each cylinder has longitudinally-spaced inlet and exhaust ports that are located near respective ends of the cylinder. Each of the opposed pistons in the cylinder controls one of the ports, opening the port as it moves to a bottom center (BC) location, and closing the port as it moves from BC toward a top center (TC) location. One of the ports provides passage for the products of combustion out of the bore, the other serves to admit charge air into the bore; these are respectively termed the "exhaust" and "intake" ports. In a uniflow-scavenged opposed-piston engine, charge air enters a cylinder through its intake port and exhaust gas flows out of its exhaust port, thus gas flows through the cylinder in a single direction ("uniflow")—from intake port to exhaust port. The flow of gas is referred to as the "gas exchange" process. The gas exchange process occurs during that part of the cycle when the intake and exhaust ports are open. For each cylinder of the engine, gas exchange starts at the first port opening of a cycle and stops at the last port closure of the cycle.

In FIG. 1, a uniflow-scavenged, two-stroke cycle internal combustion engine is embodied by an opposed-piston engine 49 having at least one ported cylinder 50. For example, the engine may have one ported cylinder, two ported cylinders, three ported cylinders, or four or more ported cylinders. Each ported cylinder 50 has a bore 52 and longitudinally-spaced exhaust and intake ports 54 and 56 formed or machined in the cylinder wall, near respective ends of the cylinder. Each of the exhaust and intake ports 54 and 56 includes one or more circumferential arrays of openings in which adjacent openings are separated by a solid bridge. In some descriptions, each opening is referred to as a "port"; however, the construction of a circumferential array of such "ports" is no different than the port constructions shown in FIG. 1. In the example shown, the engine 49 further includes two crankshafts 71 and 72. The exhaust and intake pistons 60 and 62 are slidably disposed in the bore 52 with their end surfaces 61 and 63 opposing one another. The exhaust pistons 60 are coupled to the crankshaft 71, and the intake pistons are coupled to the crankshaft 72.

As the pistons 60 and 62 near TC, a combustion chamber is defined in the bore 52 between the end surfaces 61 and 63 of the pistons. Fuel is injected directly into the combustion chamber through at least one fuel injector nozzle 100 positioned in an opening through the sidewall of a cylinder 50. The fuel mixes with charge air admitted into the bore through the intake port 56. As the air-fuel mixture is compressed between the end surfaces it reaches a temperature that causes combustion.

With further reference to FIG. 1, the engine 49 includes an air handling system 51 that manages the transport of charge air provided to, and exhaust gas produced by, the engine 49. A representative air handling system construction includes a charge air subsystem and an exhaust subsystem. In the air handling system 51, the charge air subsystem includes a charge air source that receives fresh air and processes it into charge air, a charge air channel coupled to the charge air source through which charge air is transported to the at least one intake port of the engine, and at least one air cooler in the charge air channel that is coupled to receive and cool the charge air (or a mixture of gasses including charge air) before delivery to the intake port or ports of the engine. Such a cooler can comprise an air-to-liquid and/or an air-to-air device, or another cooling device. The exhaust subsystem includes an exhaust channel that transports exhaust products from exhaust ports of the engine for delivery to other exhaust components.

With further reference to FIG. 1, the air handling system 51 includes a turbocharger 120 with a turbine 121 and a compressor 122 that rotate on a common shaft 123. The turbine 121 is coupled to the exhaust subsystem and the compressor 122 is coupled to the charge air subsystem. The turbocharger 120 extracts energy from exhaust gas that exits the exhaust ports 54 and flows into an exhaust channel 124 directly from the exhaust ports 54, or from an exhaust manifold 125 that collects exhaust gasses output through the exhaust ports 54. In this regard, the turbine 121 is rotated by exhaust gas passing through it. This rotates the compressor 122, causing it to generate charge air by compressing fresh air. The charge air subsystem includes a supercharger 110. The charge air output by the compressor 122 flows through a charge air channel 126 to a cooler 127, whence it is pumped by the supercharger 110 to the intake ports. Charge air compressed by the supercharger 110 can be output through a cooler 129 to an intake manifold 130. In this regard, each intake port 56 receives pressurized charge air from the intake manifold 130. Preferably, in multi-cylinder opposed-piston engines, the intake manifold 130 is constituted of an intake plenum that communicates with the intake ports 56 of all cylinders 50.

In some aspects, the air handling system shown in FIG. 1 can be constructed to reduce NOx emissions produced by combustion by recirculating exhaust gas through the ported cylinders of the engine. The recirculated exhaust gas is mixed with charge air to lower peak combustion temperatures, which reduces production of NOx. This process is referred to as exhaust gas recirculation ("EGR"). The EGR construction shown obtains a portion of the exhaust gasses flowing from the port 54 during scavenging and transports them via an EGR loop external to the cylinder into the incoming stream of fresh intake air in the charge air subsystem. Preferably, the EGR loop includes an EGR channel 131. The recirculated exhaust gas flows through the EGR channel 131 under the control of a valve 138 (this valve is also called the "EGR valve").

In many two-stroke engines, combustion and EGR operation are monitored and optimized based on various measurements related to the amount of charge air delivered to the engine. For example, the ratio of the mass of charge air delivered to a cylinder to the reference mass of charge air required for stoichiometric combustion in the cylinder ("lambda") is used to control NOX emissions over a range of engine operating conditions. However, in a two-stroke cycle opposed-piston engine with uniflow scavenging, port opening times overlap for a portion of each cycle and some of the charge air delivered to a cylinder through its intake port flows out of the cylinder before the exhaust port is closed. The charge air flowing out of the exhaust port during scavenging is not available for combustion. Thus, a value of lambda based on charge air delivered ("delivered lambda") to the intake port of a cylinder in an opposed-piston engine with uniflow scavenging overstates the amount of charge air actually available for combustion.

According to priority application Ser. No. 13/926,360, in a two-stroke cycle opposed-piston engine with uniflow scavenging, trapped lambda ($\lambda_{tr}$) is estimated or calculated based upon the charge air trapped in a cylinder by the last port to close. In this regard, the last port to close can be either the intake port or the exhaust port. Relatedly, the ratio of the mass of charge air trapped in the cylinder by the last port to close (hereinafter, "last port closing", or "LPC") to a reference mass of charge air required for stoichiometric combustion in the cylinder is referred to as "trapped lambda". Since it is the trapped charge air that is available for combustion, a trapped lambda value provides a more accurate representation of the combustion and emission potentials of the engine than a delivered lambda value. A method for determining trapped lambda ($\lambda_{tr}$) is given in priority application Ser. No. 13/926, 360.

Other air handling parameters are used to control various aspects of combustion and EGR operation in two-stroke engines and determinations of their values are based on estimations or calculations that include lambda. For example, burned gas fraction (ratio of burned gas to in-cylinder mass) has a significant impact on the combustion process and thus the emissions of a two-stroke engine. Priority application Ser. No. 13/926,360 discloses a method for determining trapped burned gas fraction ($BF_{tr}$) using trapped lambda. The trapped burned gas fraction is used to vary the EGR flow rate using an EGR valve to minimize the error between the actual and desired trapped burned gas fraction.

The trapped burned gas fraction provides an important measure of the combustion process and thus of the emissions of an opposed-piston engine. Control of the trapped burned gas fraction can enable an air handling control mechanization to monitor and adjust the combustion process and thereby control emissions as engine operating conditions change. Control of an external burned gas fraction alone does not always provide the degree of precision as may be needed because there can be a significant difference between in-cylinder trapped burned gas fraction and a burned gas fraction based on external EGR. Therefore, in order to control emissions, it is desirable to be able to control the trapped burned gas fraction at all times.

Accordingly, there is a need to improve the accuracy of trapped burned gas fraction control in uniflow-scavenged, opposed-piston engines.

SUMMARY

A method is provided for controlling trapped burned gas fraction in a two-stroke cycle opposed-piston engine with uniflow scavenging by adjusting an external EGR setpoint in real time. The setpoint is external in the sense that it relates to a condition or element outside of (external to) any cylinder of the engine. In some aspects, the external EGR setpoint is provided as an output that the air handling system control mechanization produces according to a current engine operating state. In this regard, the trapped burned fraction is controlled based on determining a portion of EGR useful for obtaining the desired trapped burned gas fraction. This determination is based on air handling parameters and an empirical scavenging model. Advantageously, the method affords control of the trapped burned gas fraction in real time.

In some aspects, the external EGR setpoint is called "% EGR", which refers to a ratio of the mass flow rate of exhaust gas through an EGR channel to the total mass flow rate of compressed fresh air and exhaust gas through a charge air channel.

DETAILED DESCRIPTION OF PREFERRED EMBODIMENTS

Figure 1:
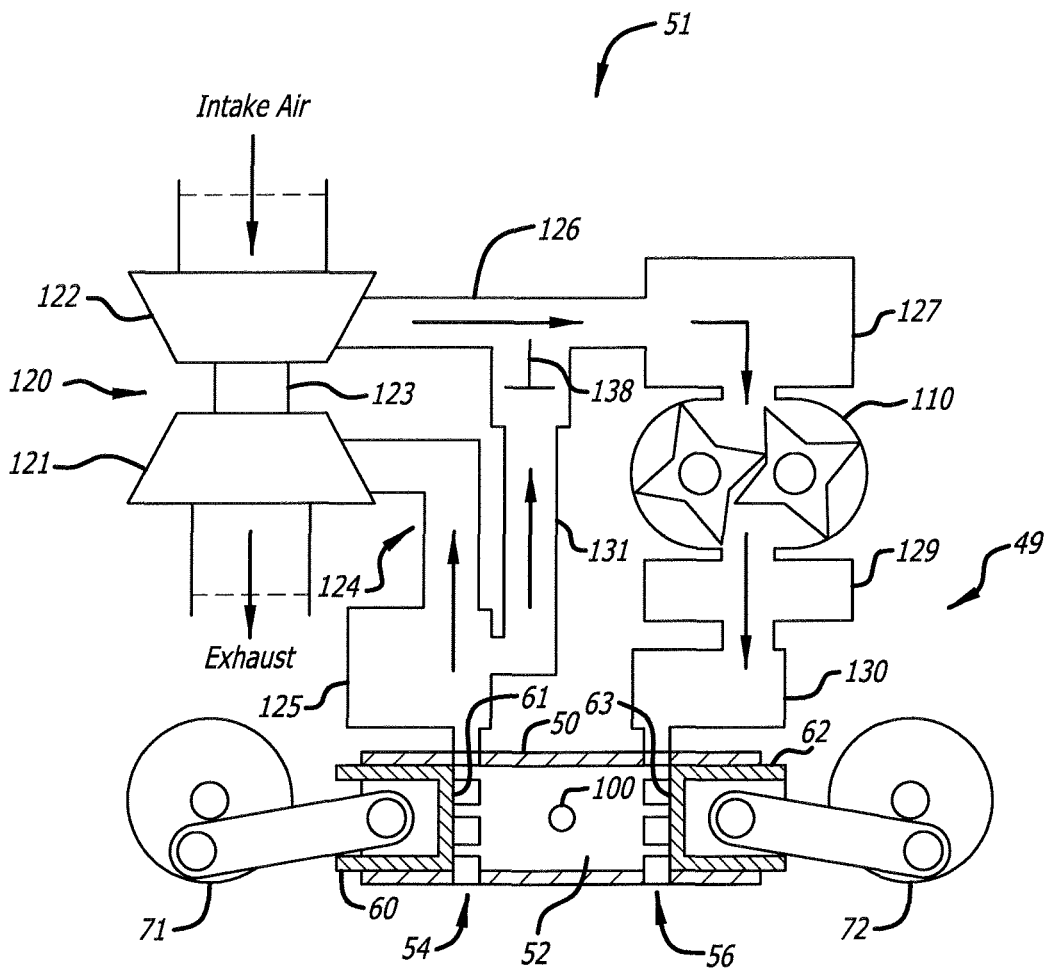
FIG. 1 is a diagram of an opposed-piston engine equipped with an air handling system with EGR and is properly labeled "Prior Art".

It is desirable to control the flow of charge air through the charge air channel of a two-stroke cycle opposed-piston engine with uniflow scavenging in order to maintain optimal control of combustion and emissions in response to variations in the operational state of the engine. Using the engine of FIG. 1 as a basis, FIG. 2 shows a control mechanization for such an opposed-piston engine, based on modifications and additions that are useful for controlling the air handling system according to this specification.

Figure 2:
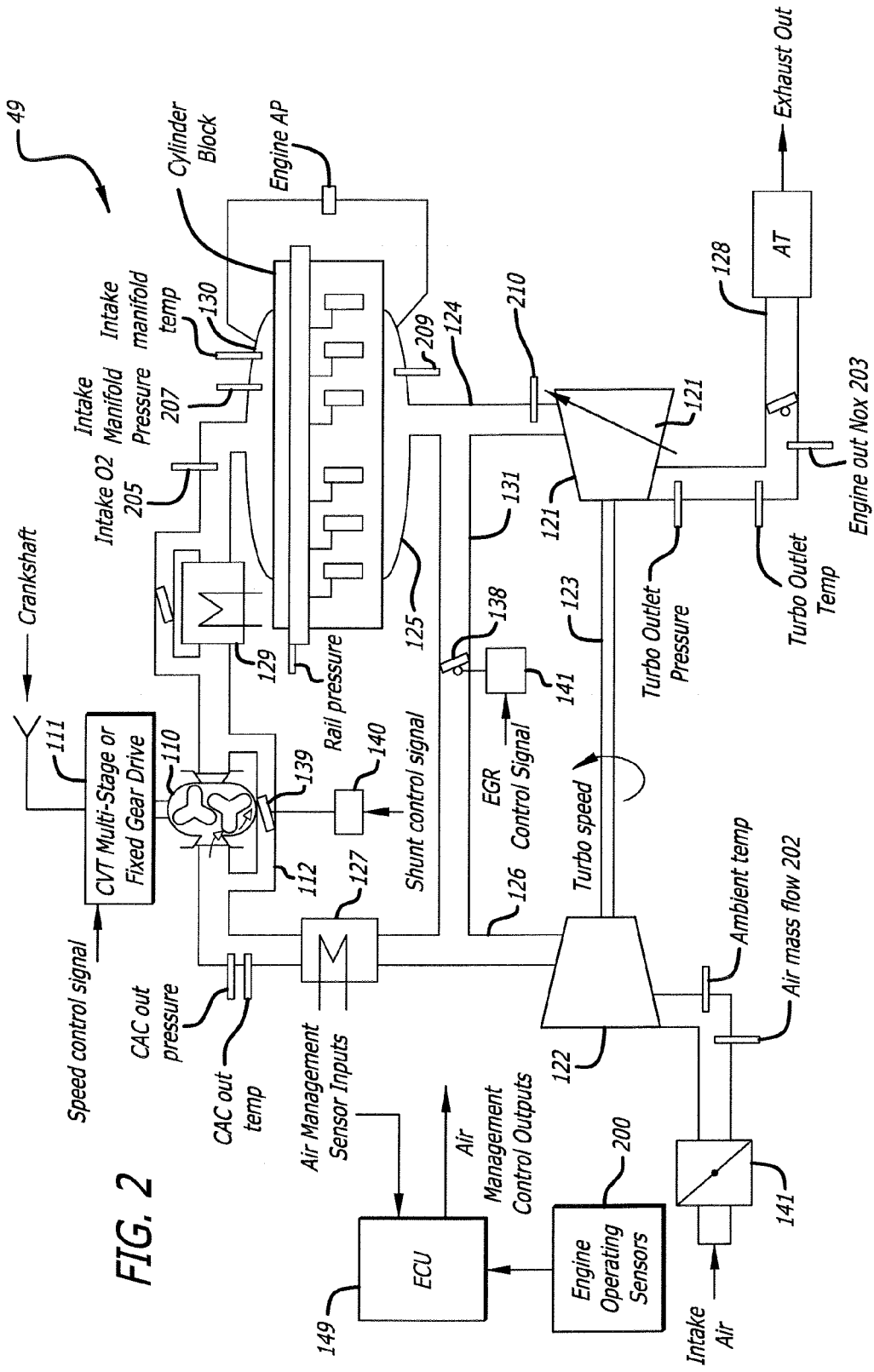
FIG. 2 is a schematic drawing illustrating a control mechanization for regulation of an air handling system in an opposed-piston engine.

An example of a specific EGR loop construction for a two-stroke cycle opposed-piston engine with uniflow scavenging is the high pressure configuration illustrated in FIG. 2 (which is not intended to be limiting). In this regard, a high pressure EGR loop circulates exhaust gas obtained from a source upstream of the input to the turbine 121 to a mixing point downstream of the output of the compressor 122. In this EGR loop, the EGR channel 131 and the EGR valve 138 shunt a portion of the exhaust gas from the exhaust channel 124 into the charge air channel 126 where it is mixed with compressed fresh air output by the compressor 122. Operation of the valve 138 is controlled by the actuator 141 in response to an EGR control signal. If no exhaust/air mixing is required, the valve 138 is fully shut and charge air with no exhaust gas component is delivered to the cylinders. As the valve 138 is increasingly opened, an increasing amount of exhaust gas is mixed into the charge air. Conversely, from an open state, as the valve 138 is increasingly closed, a decreasing amount of exhaust gas is mixed into the charge air. This loop subjects the recirculated exhaust gas to the cooling effects of the two coolers 127 and 129. If less cooling is merited, the exhaust gas portion can be shunted around the cooler 127 to the input of the supercharger 110; this alternative subjects the exhaust gas portion to cooling by only the charge air cooler 129. A dedicated EGR cooler to cool only exhaust gas can be incorporated into the EGR channel 131, in series with the valve 138, or in series with the output port of the valve 138 and the input to the supercharger 110.

As per FIG. 2, in most aspects the supercharger 110 is coupled by a drive mechanism 111 to a crankshaft to be driven thereby. The drive mechanism 111 can comprise a stepwise transmission, or continuously variable transmission (CVT), device, in which cases, charge air flow can be varied by varying the speed of the supercharger 110 in response to a speed control signal provided to the drive mechanism. Alternatively, the drive mechanism 111 can be a fixed gear device, in which case the supercharger 110 is continuously driven at a fixed speed. In such a case, charge air flow can be varied by way of a shunt channel 112 that couples the output of the supercharger 110 to its input. Provision of a bypass valve 139 in the shunt channel 112 allows the charge air flow to be varied by modulation of charge air pressure downstream of the supercharger outlet. In some aspects, the valve 139 is operated by an actuator 140 in response to a shunt control signal.

As seen in FIG. 2, a control mechanization to operate the air handling system of a two-stroke cycle opposed-piston engine with uniflow scavenging includes an ECU 149. Preferably, the ECU 149 is constructed to control charge air flow and the amount of exhaust gas mixed with the pressurized charge air in response to specified engine operating conditions by automatically operating the valves 138 and 139 (and, possibly other valves), the supercharger 110, if a multi-speed or variable speed device is used, and the turbo-charger, if a variable-geometry device is used. Of course, operation of valves and associated elements used for EGR can include any one or more of electrical, pneumatic, mechanical, and hydraulic actuating operations. For fast, precise automatic operation, it is preferred that the valves be high-speed, computer-controlled devices with continuously-variable settings. Each valve has a state in which it is open (to some setting controlled by the ECU 149) to allow gas to flow through it, and a state in which it is closed to block gas from flowing through it.

Methods for controlling the trapped burned gas fraction of a two-stroke cycle opposed-piston engine with uniflow scavenging (hereinafter, "the engine") use various parameters to calculate or estimate magnitudes and ratios of elements of combustion trapped in a cylinder of the engine by the last port closing of the cylinder. In this regard, the "elements of combustion" include either or both of constituents and products of combustion. For a better understanding of these methods, an explanation of a number of air handling parameters used to represent these elements is given with reference to various elements of an air handling control mechanization according to FIG. 2. All of the air handling parameters in the following explanation have SI units unless specified otherwise.

Air Handling Parameters
$W_{air}$=Mass flow rate of fresh air in kg/s
$W_{egr}$=Mass flow rate of EGR gas in kg/s
$W_{sc}$=Mass flow rate of delivered charge air to a cylinder in kg/s
$W_f$=Commanded engine fuel injection rate in kg/s
$M_{res}$=Mass of residuals in cylinder in kg
$M_{tr}$=Mass of trapped cylinder gases at LPC in kg
$M_{ret}$=Mass of delivered charge air retained in cylinder in kg
$M_{del}$=Mass of charge air delivered to the cylinder in kg
$M_{O_2\_tr}$=Mass of trapped oxygen at end of a gas exchange process
$m_{O2\_air}$=Mass fraction of $O_2$ in fresh air
$m_{O2\_egr}$=Mass fraction of $O_2$ in EGR
$m_{O2\_res}$=Mass fraction of $O_2$ in cylinder residuals
$m_{O_2\_im}$=Mass fraction of $O_2$ in intake manifold
$T_{comp\_out}$=Compressor out temperature in K
$T_{egr}$=EGR temperature after cooler in K
$T_{tr}$=Temperature of trapped charge in cylinder at LPC in K
$[O_2]_{im}$=Percent volumetric concentration of $O_2$ in intake manifold
$[O_2]_{egr}$=Percent volumetric concentration of $O_2$ in exhaust gas
$[O_2]_{air}$=Percent volumetric concentration of $O_2$ in fresh air $\left(\frac{O_2}{F}\right)_s$ = Stoichiometric oxygen to fuel ratio $\left(\frac{A}{F}\right)_s$ = Stoichiometric air to fuel ratio γ=Ratio of specific heats
N=Number of cylinders
$V_d$=Displacement volume per cylinder in m³
$V_{tr}$=Displacement volume at LPC per cylinder in m³
R=Gas constant of air J/Kg/K
$R_{o2}$=Gas constant of oxygen in J/Kg/K
$AFR_s$=Stoichiometric air fuel ratio for diesel
$AFR_g$=Global air fuel ratio (ratio of fresh air to fuel)
$AFR_{tr}$=Trapped air fuel ratio (ratio of air in cylinder to fuel)
$P_{rail}$=fuel rail Pressure
Inj_time=Injection Timing Definitions Trapped lambda: a useful method for determining trapped lambda is given in priority application Ser. No. 13/926,360 by:

$$\lambda_{tr} = \frac{\left(\frac{N}{W_f} \frac{M_{O_2\_tr} RPM}{60}\right)}{\left(\frac{O_2}{F}\right)_s} \qquad \text{Eq 1}$$

Burned gas is a gas composition that is the result of stoichiometric combustion of fuel. This gas composition does not have any oxygen molecules; typically, it comprises CO2, H2O, N2 and other inert gases present in air.

Burned gas fraction is a ratio of burned gases to a reference mass. A burned gas fraction of 1 indicates stoichiometric combustion, implying that all the oxygen in the air has been used up to convert fuel ($C_xH_y$) into $CO_2$ and $H_2O$. On the other hand, a burned gas fraction of <1 indicates non-stoichiometric combustion, implying that some the oxygen remains in addition to the burned gas.

Trapped burned gas fraction is a ratio of burned gas trapped in a cylinder at the end of the gas exchange process to the trapped mass.

At the end of the gas exchange process, signified by LPC, the trapped mass is equal to trapped air and trapped burned gases. Thus, a trapped burned gas fraction can be calculated as follows:

$$BF_{tr} = \frac{\left(M_{tr} - \frac{W_f}{N} \frac{\lambda_{tr} \cdot AFR_s \cdot 60}{RPM}\right)}{M_{tr}} \qquad \text{Eq 2}$$

Another method of determining a trapped burned gas fraction is given by Equation 35 in priority application Ser. No. 13/926,360.

Figure 3:
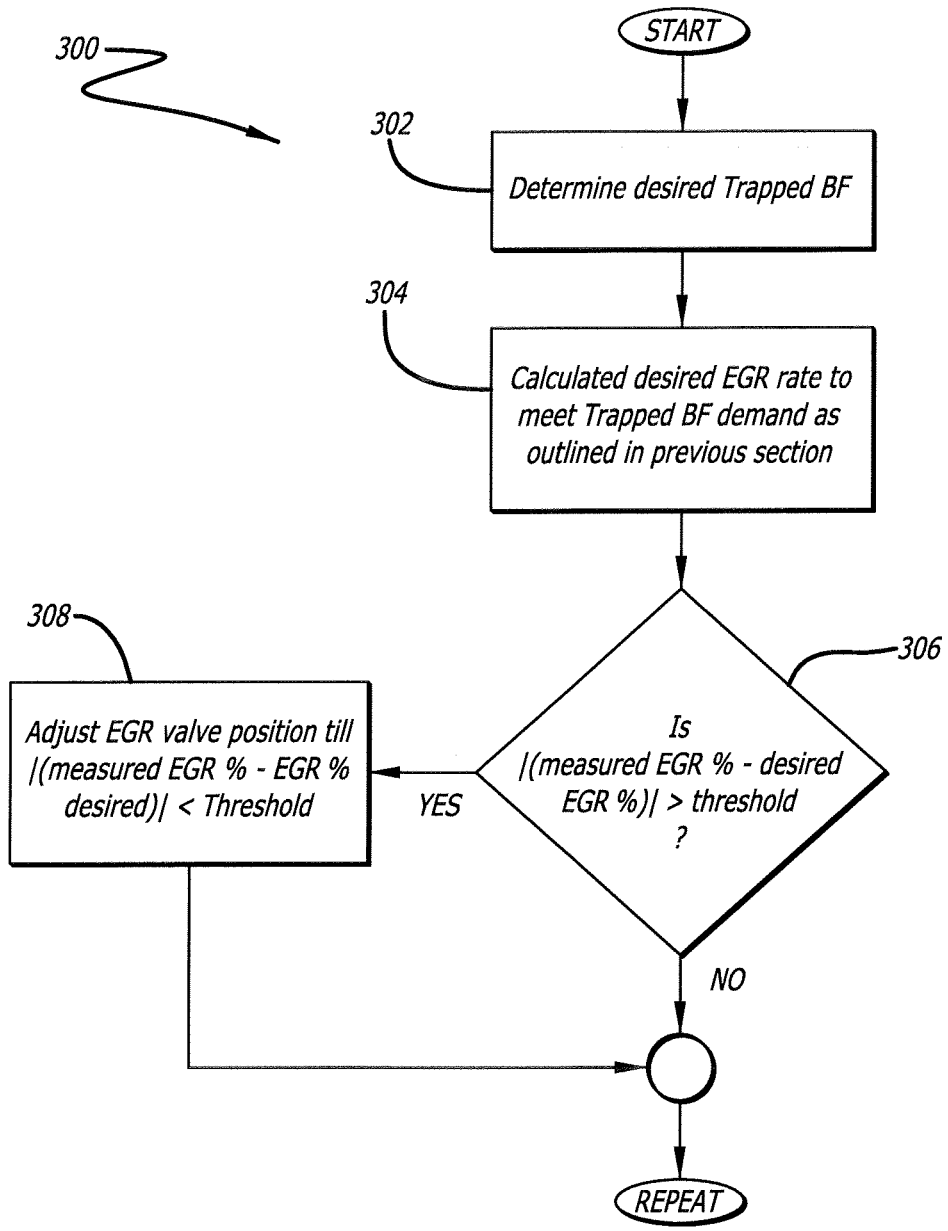
FIG. 3 is a control flow diagram showing a process for evaluating and adjusting the numerical values of the air handling control parameters.
Figure 4:
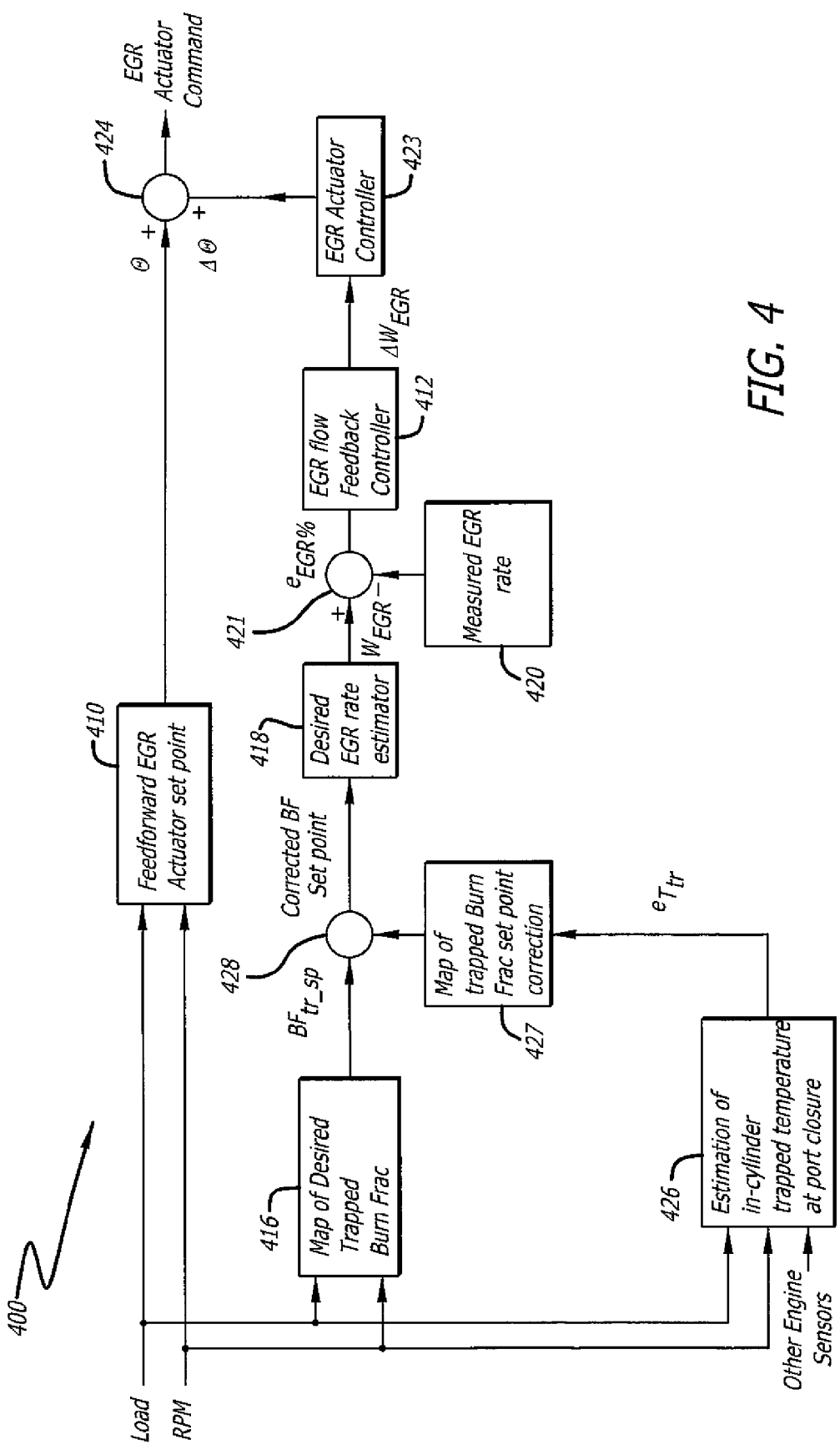
FIG. 4 is a schematic diagram showing a control mechanization that implements the evaluating and adjusting process of FIG. 3.

Trapped Burned Gas Fraction Control Using % EGR: Air handling control can be implemented using an air handling control mechanization based on that illustrated in FIG. 2, in which the ECU 149 can be programmed to control operations of the air handling system by methods illustrated by the diagrams of FIGS. 3 and 4. In this regard, FIG. 3 shows a process for evaluating and adjusting the numerical values of air handling control parameters. FIG. 4 schematically illustrates a preferred control mechanization that implements the evaluating and adjusting process of FIG. 3.

Initially, the ECU 149 reads available engine sensors 200 so as to determine current numerical values for air handling parameters in the current state of engine operation. Using these sensor values, the ECU 149 determines a current engine operating state in terms of torque demand (load) and RPM and performs a routine comprising a sequence of operations and calculations corresponding essentially to Equations 1 and 2.

EGR Setpoint Determination: A desired trapped burned gas fraction can be obtained directly by adjusting the EGR valve 138. A desired trapped burned gas fraction can also be obtained by first determining a desired % EGR setpoint from it and other operating conditions and then adjusting the EGR valve 138. This method is advantageous because, once a desired % EGR setpoint is determined the ECU 149 can use it to regulate the EGR rate. The following equations outline the method to determine a % EGR setpoint from a trapped burned gas fraction setpoint.

The mass of EGR ($M_{egr}$) required to meet a desired trapped burned gas fraction can be calculated as follows:

$$M_{egr} = \frac{BF_{tr}M_{tr} - M_{res}BG_{res}}{\eta_{tr}BG_{exh}} \qquad \text{Eq 3}$$

In Equation 3, $BF_{tr}$ is a desired target values obtained from an empirical model and stored in or with the ECU 149, and $$BG_{exh} = \frac{(AFR_s + 1)}{(AFR_g + 1)} \qquad \text{Eq 4}$$

$$BG_{res} = 1 - AFR_s \frac{(\lambda_{tr} - 1)}{M_{tr}} \frac{W_f \cdot 60}{RPM \cdot N} \qquad \text{Eq 5}$$

Methods for determining $M_{tr}$ and $BF_{tr}$ are set forth in in priority application Ser. No. 13/926,360.

Since $M_{egr}$ is now known, $W_{egr}$ can be calculated by:

$$W_{egr} = \frac{M_{egr}(N)(RPM)}{60} \qquad \text{Eq 6}$$

Thus, the % EGR required to reach a desired $BF_{tr}$ can be calculated by:

$$\% \ EGR = \frac{W_{egr}}{W_{air} + W_{egr}} \qquad \text{Eq 7}$$

EGR Control Method to Achieve Trapped Burned Gas fraction Setpoint: The external EGR setpoint is controlled by adjusting the position of the EGR valve 138 shown in FIG. 2. The ECU 149 reads all the available engine sensors 200. Based on the sensor values the EGR control method determines the current engine torque demand (load) and RPM. This information is fed into a desired trapped cylinder condition routine executed by the ECU 149. In this routine the ECU 149 determines $BF_{tr}$ based on look up maps (tables) that are indexed by engine torque and RPM to meet desired performance and emission goals. The determined $BF_{tr}$ setpoint is corrected for variations in trapped temperature based on another map. These maps are pre-filled based on engine dynamometer testing and stored in or with the ECU 149. The ECU 149 determines a desired external % EGR and executes a method of controlling trapped burned gas fraction. Representative embodiments of the method are illustrated by the flowchart shown in FIG. 3 and the control diagram of FIG. 4.

As per FIG. 3, a trapped burned gas fraction routine 300 accesses a map to determine a desired trapped burned gas fraction value for the current engine operating state at step 302 and then, in step 304, determines the desired mass flow rate of EGR that meets the desired trapped burned gas fraction value. In step 306, an actual (measured or calculated) EGR mass flow rate value is compared to the desired EGR mass flow rate value. Preferably the comparing process includes subtracting the desired value from the measured value. If the absolute value of this difference is greater than a threshold, the routine 300, in step 308, adjusts the position of the EGR valve 138 to bring the absolute value to, or below the threshold. The routine 300 cycles continuously during engine operation. In some aspects, the cycle time of the routine 300 can exceed or equal the engine's cycle time. In yet other aspects, the routine 300 can cycle on a per-cylinder basis.

An exemplary control mechanization with which actual trapped burned gas fraction can be controlled is shown in FIG. 4. This control mechanization 400 includes a trapped burned gas fraction controller comprising a feed forward controller 410, a feedback controller 412, and maps 416 and 418 of desired trapped burned gas fraction and desired % EGR ratio, respectively. The feed forward controller 410 outputs an EGR valve setpoint Θ based on a map that is indexed by engine load and speed. This map is pre-filled with empirical data based on engine dynamometer testing and stored in or with the ECU 149. The map 416 outputs a desired burned gas fraction setpoint ($BF_{tr\_sp}$) based on a table of values that is indexed by engine load and speed. The map 418 outputs a desired EGR mass flow rate ($W_{egr\_des}$) based on a table of values that is indexed by the desired burned gas fraction setpoint produced by map 416. The maps 416 and 418 are pre-filled with empirical data based on engine dynamometer testing and stored in or with the ECU 149. At 420, the actual EGR mass flow rate is determined by sensing and/or by calculation; see Equations 5 and 6 in priority application Ser. No. 13/926,360 for examples of EGR mass flow measurement and calculation.

The adder 421 generates an error based on comparison of the desired and actual % EGR ratios (step 306 of FIG. 3), and the feedback controller 412 converts this error into a change required in EGR flow ($\Delta W_{EGR}$) to minimize the error. The feedback controller 412 can be implemented with a PID controller, a gain scheduled PID controller, or another non-linear controller such as a sliding mode controller. An EGR valve actuator controller 423 converts the required change in EGR flow into an EGR valve position. The EGR actuator controller 423 that translates EGR flow change to an EGR actuator output (ΔΘ) can be implemented as a PID controller or gain scheduled PID controller in conjunction with an EGR model (physical or empirical). The EGR actuator output from the actuator controller 423 is added (or subtracted depending on the sign) to the output of the feed-forward controller 410 at 424. A final EGR valve actuator command is then sent via the ECU 149. The EGR valve actuator command is provided as an EGR control signal to the EGR valve actuator 141.

Referring again to FIG. 4, in some aspects it may be desirable to adjust the desired burned gas fraction setpoint based upon estimation of the temperature of the trapped mass in the cylinder at LPC. It can be calculated by an arithmetic unit 426 as per Equation 42 of priority application Ser. No. 13/926, 360. In this regard, the unit 426 then compares actual trapped temperature $T_{tr}$ to a predefined value of trapped temperature. The predefined value of trapped temperature is determined based on engine dynamometer testing and is stored in or with the ECU 149. If the actual trapped temperature turns out to be greater than this predefined temperature then the control mechanization 400 adjusts the desired trapped burned gas fraction setpoint at 428 to minimize the impact of trapped temperature on emissions. In this regard, adjustments to the desired trapped burned gas fraction setpoint are made on the basis of a map implemented by a look up table 427, which is indexed by a trapped temperature error $e_{T_{tr}}$ output by 426. The values for this look up table can be determined by engine dynamometer testing and stored in or with the ECU 149.

Although the embodiments illustrated and described herein attribute actual parameter values based on conditions in the manifolds 125 and 130 to the cylinders of the engine, it should be evident to those skilled in the art that the principles involved can be applied to the individual cylinders themselves, presuming that cost and space permit placement and operation of relevant sensors on one or more of the cylinders of a production engine. Further, the desired parameter values are obtained by empirical methods that map or synchronize those values to port closing times for a cylinder of a uniflow scavenged, two-stroke cycle opposed-piston engine running, for example, in a dynamometer.

Although air handling control has been described with reference to a particular trapped parameter and adjustment of a particular external condition, those of ordinary skill in the art will realize that control of trapped burned gas fraction by adjustment of an EGR flow or an EGR setpoint may be combined with control of other trapped conditions by adjustment of other air handling parameters.

Although air handling control has been described with reference to an opposed-engine with two crankshafts, it should be understood that these constructions can be applied to opposed-piston engines with one or more crankshafts. Moreover, various aspects of these constructions can be applied to opposed-piston engines with ported cylinders disposed in opposition, and/or on either side of one or more crankshafts Accordingly, the patent protection accorded to the above-described constructions is limited only by the following claims.

The invention claimed is:

1. A uniflow-scavenged opposed-piston engine equipped with an air handling system, comprising:
   at least one cylinder with a bore, longitudinally-spaced exhaust and intake ports, and a pair of pistons disposed in opposition in the bore and operative to open and close the exhaust and intake ports during operation of the engine;
   a charge air channel to provide charge air to at least one intake port;
   an exhaust channel to receive exhaust gas from at least one exhaust port;
   an exhaust gas recirculation (EGR) loop having a loop input coupled to the exhaust channel and a loop output coupled to the charge air channel; and,
   a control mechanization operable to:
      determine a value of a trapped air handling parameter based on elements of combustion trapped in the cylinder by the last port of the cylinder to close during a cycle of engine operation and adjust the value of the trapped air handling parameter in response to a rate of EGR flow in the EGR loop; and
      adjust the rate of EGR flow in the EGR loop based on the adjusted value of the trapped air handling parameter.

2. The opposed-piston engine of claim 1, in which the control mechanization is operable to adjust the rate of EGR flow by operating a valve in the EGR loop to increase or decrease exhaust gas flow through the EGR loop.

3. The opposed-piston engine of claim 2, in which the trapped air handling parameter is trapped burned gas fraction and the control mechanization is operable to:
   determine a desired trapped burned gas fraction value for a current engine operating state;
   determine a % EGR ratio defined by $$\% \ EGR = \frac{W_{egr}}{W_{air} + W_{egr}}$$

in which $W_{egr}$ is a mass flow rate of EGR gas in the EGR loop and $W_{air}$ is a mass flow rate of air into the charge air channel;
   determine an error value based upon a difference between a desired % EGR ratio and a measured % EGR ratio; and,
   adjust EGR flow by operating the valve in the EGR loop in response to the error value.

4. The opposed-piston engine of claim 2, in which the control mechanization is operable to correct the value of the trapped air handling parameter based upon a trapped temperature parameter.

5. The opposed-piston engine of claim 4, in which the trapped air handling parameter is trapped burned gas fraction and the control mechanization is operable to:
   determine a desired trapped burned gas fraction value for a current engine operating state;
   determine a % EGR ratio defined by $$\% \ EGR = \frac{W_{egr}}{W_{air} + W_{egr}}$$

in which $W_{egr}$ is a mass flow rate of EGR gas in the EGR loop and $W_{air}$ is a mass flow rate of air into the charge air channel;
   determine an error value based upon a difference between a desired % EGR ratio and a measured % EGR ratio; and,
   adjust EGR flow by operating the valve in the EGR loop in response to the error value.

6. A method of operating an opposed-piston engine, comprising:
- generating exhaust gas in at least one ported cylinder of the engine;
- transporting exhaust gas from an exhaust port of the ported cylinder through an exhaust channel;
- recirculating a portion of the exhaust gas from the exhaust channel;
- pressurizing fresh air;
- mixing recirculated exhaust gas with the pressurized fresh air to form charge air;
- pressurizing the charge air;
- providing the charge air to an intake port of the ported cylinder;
- determining a value of a trapped air handling parameter based on elements of combustion trapped in the cylinder by the last port of the cylinder to close during a cycle of engine operation;
- adjusting the value of the trapped air handling parameter in response to a rate of EGR flow in the EGR loop; and
- adjusting the rate of EGR flow in the EGR loop based on the adjusted value of the trapped air handling parameter.

7. The method of claim 6, in which adjusting the rate of EGR flow includes operating a valve in the EGR loop to increase or decrease exhaust gas flow through the EGR loop.

8. The method of claim 7, in which the trapped air handling parameter is trapped burned gas fraction and determining a value includes:
- determining a desired trapped burned gas fraction value for a current engine operating state;
- determining a % EGR ratio defined by $$\% \, EGR = \frac{W_{egr}}{W_{air} + W_{egr}}$$

in which $W_{egr}$ is a mass flow rate of EGR gas in the EGR loop and $W_{air}$ is a mass flow rate of air into the charge air channel;
- determining an error value based upon a difference between a desired % EGR ratio and a measured % EGR ratio; and,
- adjusting EGR flow by operating the valve in the EGR loop in response to the error value.

9. The method of claim 7, in which the control mechanization is operable to correct the value of the trapped air handling parameter based upon a trapped temperature parameter.

10. The method of claim 9, in which the trapped air handling parameter is trapped burned gas fraction and determining a value includes:
- determining a desired trapped burned gas fraction value for a current engine operating state;
- determining a % EGR ratio defined by $$\% \, EGR = \frac{W_{egr}}{W_{air} + W_{egr}}$$

in which $W_{egr}$ is a mass flow rate of EGR gas in the EGR loop and $W_{air}$ is a mass flow rate of air into the charge air channel;
- determining an error value based upon a difference between a desired % EGR ratio and a measured % EGR ratio; and,
- adjusting EGR flow by operating the valve in the EGR loop in response to the error value.

11. A uniflow-scavenged opposed-piston engine, comprising:
- at least one cylinder with a bore, longitudinally-spaced exhaust and intake ports, and a pair of pistons disposed in opposition in the bore and operative to open and close the exhaust and intake ports during operation of the engine;
- a charge air channel to provide charge air to at least one intake port;
- an exhaust channel to receive exhaust gas from at least one exhaust port;
- an exhaust gas recirculation (EGR) loop having a loop input coupled to the exhaust channel and a loop output coupled to the charge air channel; and,
- a control mechanization operable to:
  - determine a trapped burned gas fraction value for a current engine operating state based on elements of combustion trapped in the cylinder by the last port of the cylinder to close during a cycle of engine operation;
  - determine a desired setpoint for EGR flow in the EGR loop for the trapped burned gas fraction value;
  - compare the desired setpoint with an actual rate of EGR flow in the EGR loop; and,
  - adjust the position of an EGR valve in the EGR loop based on the comparison.

12. The opposed-piston engine of claim 11, in which the control mechanization is operable to adjust the actual rate of EGR flow in the EGR loop by adjusting the position of the EGR valve.

13. The opposed-piston engine of claim 12, in which the control mechanization is operable to correct the trapped burned gas fraction based upon a trapped temperature value.

14. The opposed-piston engine of claim 13, in which the control mechanization is operable to:
- determine a % EGR ratio defined by $$\% \, EGR = \frac{W_{egr}}{W_{air} + W_{egr}}$$

in which $W_{egr}$ is a mass flow rate of EGR gas in the EGR loop and $W_{air}$ is a mass flow rate of air into the charge air channel;
- determine an error value based upon a difference between a desired % EGR ratio and a measured % EGR ratio;
- correct the desired % EGR ratio based on the error; and,
- adjust EGR flow by adjusting the position of the EGR valve based on the corrected desired % EGR.

15. The opposed-piston engine of claim 12, in which the control mechanization is operable to:
- determine a % EGR ratio defined by $$\% \, EGR = \frac{W_{egr}}{W_{air} + W_{egr}}$$

in which $W_{egr}$ is a mass flow rate of EGR gas in the EGR loop and $W_{air}$ is a mass flow rate of air into the charge air channel;

determine an error value based upon a difference between a desired % EGR ratio and a measured % EGR ratio;
correct the desired % EGR ratio based on the error; and,
adjust EGR flow by adjusting the position of the EGR valve based on the corrected desired % EGR.

* * * * *